US010803664B2

(12) United States Patent
McPhee et al.

(10) Patent No.: US 10,803,664 B2
(45) Date of Patent: *Oct. 13, 2020

(54) REDUNDANT TRACKING SYSTEM

(71) Applicant: Snap Inc., Santa Monica, CA (US)

(72) Inventors: Andrew James McPhee, Culver City, CA (US); Samuel Edward Hare, Los Angeles, CA (US); Peicheng Yu, Los Angeles, CA (US); Robert Cornelius Murphy, Venice, CA (US); Dhritiman Sagar, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/853,356

(22) Filed: Apr. 20, 2020

(65) Prior Publication Data

US 2020/0250888 A1     Aug. 6, 2020

Related U.S. Application Data

(63) Continuation of application No. 16/579,463, filed on Sep. 23, 2019, which is a continuation of application (Continued)

(51) Int. Cl.
 *G06T 19/00*  (2011.01)
 *G06T 7/246*  (2017.01)
(Continued)

(52) U.S. Cl.
 CPC .......... *G06T 19/003* (2013.01); *A63F 13/211* (2014.09); *G06F 3/011* (2013.01);
(Continued)

(58) Field of Classification Search
 None
 See application file for complete search history.

(56) References Cited

U.S. PATENT DOCUMENTS 6,038,295 A     3/2000   Mattes
6,980,909 B2   12/2005   Root et al.
(Continued)

FOREIGN PATENT DOCUMENTS

CA        2887596 A1    7/2015
CN     109863510 A    6/2019
(Continued)

OTHER PUBLICATIONS

"U.S. Appl. No. 15/792,347, Final Office Action dated Jul. 9, 2019", 13 pgs.
(Continued)

*Primary Examiner* — Said Broome
(74) *Attorney, Agent, or Firm* — Schwegman Lundberg & Woessner, P.A.

(57) ABSTRACT

A redundant tracking system comprising multiple redundant tracking sub-systems, enabling seamless transitions between such tracking sub-systems, provides a solution to this problem by merging multiple tracking approaches into a single tracking system. This system is able to combine tracking objects with six degrees of freedom (6DoF) and 3DoF through combining and transitioning between multiple tracking systems based on the availability of tracking indicia tracked by the tracking systems. Thus, as the indicia tracked by any one tracking system becomes unavailable, the redundant tracking system seamlessly switches between tracking in 6DoF and 3DoF thereby providing the user with an uninterrupted experience.

20 Claims, 14 Drawing Sheets

Related U.S. Application Data

No. 15/792,347, filed on Oct. 24, 2017, now Pat. No. 10,504,287.

(60) Provisional application No. 62/412,103, filed on Oct. 24, 2016.

(51) Int. Cl.

| | | |
|---|---|---|
| *G06F 3/03* | (2006.01) | |
| *G06F 3/038* | (2013.01) | |
| *A63F 13/211* | (2014.01) | |
| *G06F 3/01* | (2006.01) | |
| *G06F 11/08* | (2006.01) | |
| *G06T 15/20* | (2011.01) | |
| *G06F 3/0346* | (2013.01) | |

(52) U.S. Cl.
CPC ............ *G06F 3/0304* (2013.01); *G06F 3/038* (2013.01); *G06F 3/0346* (2013.01); *G06F 11/08* (2013.01); *G06T 7/246* (2017.01); *G06T 15/20* (2013.01); *G06T 19/006* (2013.01); *G06F 2203/0381* (2013.01); *G06F 2203/0382* (2013.01)

(56) References Cited

U.S. PATENT DOCUMENTS

| | | |
|---|---|---|
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,031,809 B1 | 5/2015 | Kumar et al. |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,442,564 B1 | 9/2016 | Dillon |
| 9,443,227 B2 | 9/2016 | Evans et al. |
| 9,489,661 B2 | 11/2016 | Evans et al. |
| 9,491,134 B2 | 11/2016 | Rosen et al. |
| 10,504,287 B2 | 12/2019 | McPhee et al. |
| 2007/0018811 A1 | 1/2007 | Gollu |
| 2007/0096678 A1 | 5/2007 | Melrose |
| 2011/0202598 A1 | 8/2011 | Evans et al. |
| 2012/0209924 A1 | 8/2012 | Evans et al. |
| 2012/0224773 A1* | 9/2012 | Sweet, III ............. G06F 16/583 382/195 |
| 2013/0223673 A1 | 8/2013 | Davis et al. |
| 2015/0103183 A1 | 4/2015 | Abbott et al. |
| 2015/0301599 A1 | 10/2015 | Miller |
| 2015/0366527 A1* | 12/2015 | Yu ............................ G06T 7/73 382/131 |
| 2016/0073962 A1* | 3/2016 | Yu ........................ G01R 33/283 600/407 |
| 2018/0114364 A1 | 4/2018 | Mcphee et al. |
| 2020/0020158 A1 | 1/2020 | Mcphee et al. |

FOREIGN PATENT DOCUMENTS

| | | |
|---|---|---|
| WO | WO-2013017991 A1 | 2/2013 |
| WO | WO-2018081125 A1 | 5/2018 |

OTHER PUBLICATIONS

"U.S. Appl. No. 15/792,347, Non Final Office Action dated Mar. 21, 2019", 12 pgs.

"U.S. Appl. No. 15/792,347, Notice of Allowance dated Aug. 5, 2019", 9 pgs.

"U.S. Appl. No. 15/792,347, filed Apr. 22, 2019 to Non Final Office Action dated Mar. 21, 2019", 9 pgs.

"U.S. Appl. No. 15/792,347, filed Jul. 16, 2019 to Final Office Action dated Jul. 9, 2019", 9 pgs.

"U.S. Appl. No. 16/579,463, Non Final Office Action dated Oct. 21, 2019", 8 pgs.

"U.S. Appl. No. 16/579,463, Notice of Allowance dated Feb. 18, 2020", 8 pgs.

"U.S. Appl. No. 16/579,463, filed Nov. 11, 2019 to Non Final Office Action dated Oct. 21, 2019", 10 pgs.

"European Application Serial No. 17865596.5, Extended European Search Report dated Sep. 13, 2019", 11 pgs.

"European Application Serial No. 17865596.5, filed Apr. 9, 2020 to Extended European Search Report dated Sep. 13, 2019", 21 pgs.

"International Application Serial No. PCT/US2017/058093, International Preliminary Report on Patentability dated May 9, 2019", 6 pgs.

"International Application Serial No. PCT/US2017/058093, International Search Report dated Jan. 4, 2018", 2 pgs.

"International Application Serial No. PCT/US2017/058093, Written Opinion dated Jan. 4, 2018", 4 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

U.S. Appl. 15/792,347, filed Oct. 24, 2017, Redundant Tracking System, U.S. Pat. No. 10,504,287.

U.S. Appl. No. 16/579,463, filed Sep. 23, 2019, Redundant Tracking System.

* cited by examiner

```
MAINTAINING A SET OF TEMPLATES TO GENERATE OBJECTS TO BE
DISPLAYED IN THE THREE-DIMENSIONAL SPACE
902
```

```
RECEIVING A SELECTION OF A TEMPLATE FROM AMONG THE SET OF
TEMPLATES
904
```

```
RECEIVING A SELECTION OF THE POSITION IN THE THREE-DIMENSIONAL
SPACE
906
```

```
GENERATING THE OBJECT BASED ON THE SELECTED TEMPLATE
908
```

```
ASSIGNING THE OBJECT TO THE POSITION IN THE THREE-DIMENSIONAL
SPACE
910
```

FIG. 9

REDUNDANT TRACKING SYSTEM

CLAIM OF PRIORITY

This application is a continuation of U.S. patent application Ser. No. 16/579,463, filed on Sep. 23, 2019, which is a continuation of U.S. patent application Ser. No. 15/792,347, filed on Oct. 24, 2017, which claims the benefit of priority of U.S. Provisional Patent Application Ser. No. 62/412,103, filed on Oct. 24, 2016, each of which are hereby incorporated by reference herein in their entireties.

TECHNICAL FIELD

Embodiments of the present disclosure relate generally to an apparatus and method for real-time multi-degree of freedom (DoF) object tracking, which determines a position an object within a three-dimensional space. More particularly, but not by way of limitation, embodiments of the present disclosure relate to an apparatus and method for redundant DoF object tracking.

BACKGROUND

Object tracking systems can be used to create engaging and entertaining augmented reality (AR) experiences, in which 3D graphics content appears to be present in the real world. However, such tracking is subject to frequent tracking failure due to environmental conditions, user actions, unanticipated visual interruption between camera and object/scene being tracked, etc. Traditionally, tracking failure causes the AR experience either to disappear or otherwise behave erratically and breaks the illusion of the 3D graphics being present in the real world. This undermines the perceived quality of AR as a whole.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 9 is a flowchart illustrating a method for generating and rendering an object in a three-dimensional space, according to certain example embodiments.

GLOSSARY

Figure 1:
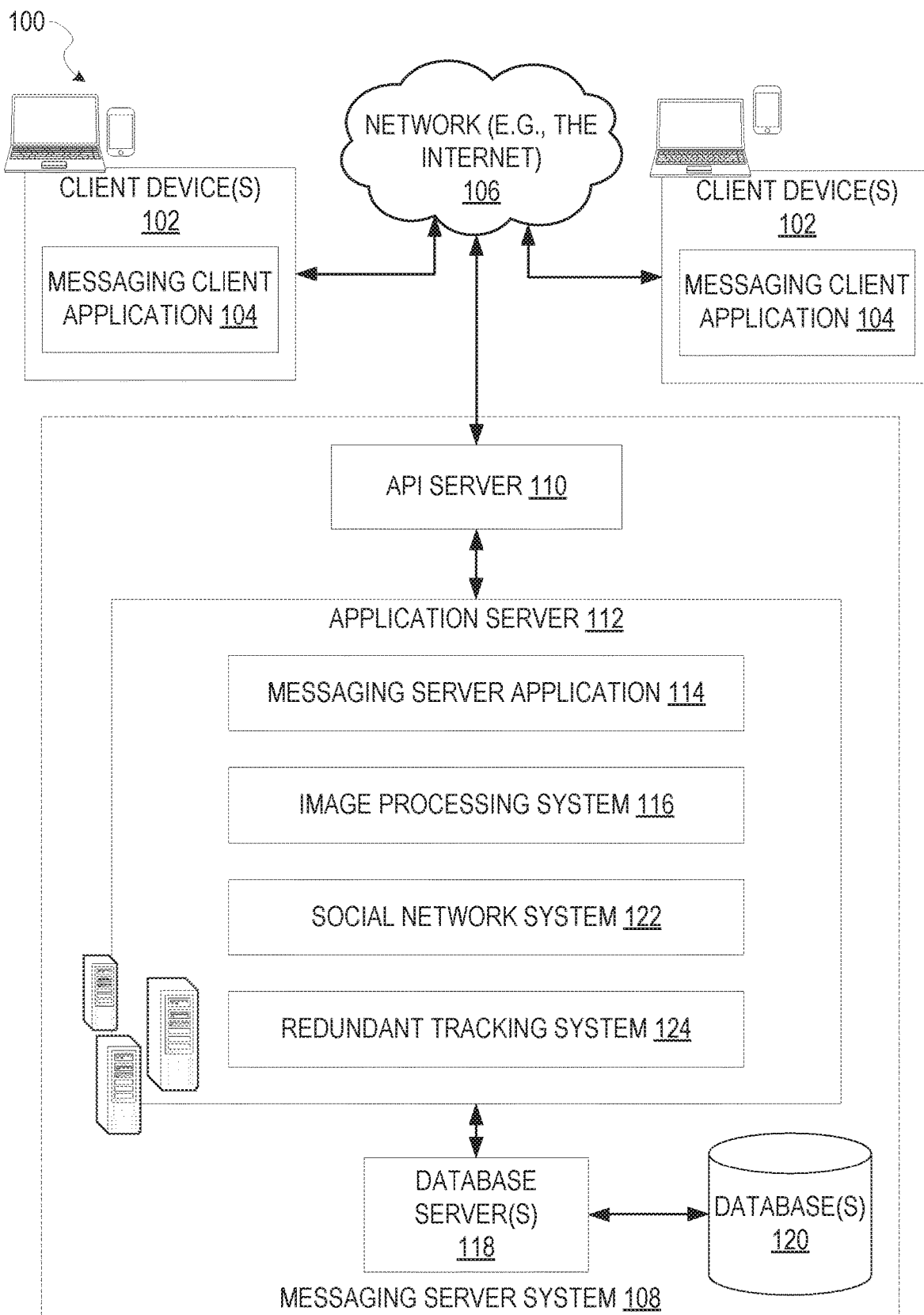
FIG. 1 is a block diagram showing an example messaging system for exchanging data (e.g., messages and associated content) over a network in accordance with some embodiments, wherein the messaging system includes a redundant tracking system.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third. Generation Partnership Project (3GPP) including 3G, fourth generation wireless (4G) networks, Universal Mobile Telecommunications System (UMTS), High Speed Packet Access (HSPA), Worldwide Interoperability for Microwave Access (Wi-MAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

DETAILED DESCRIPTION

Tracking systems are subject to frequent tracking failure due to environmental conditions, user actions, unanticipated visual interruption between camera and object/scene being tracked, etc. Traditionally, such tracking failures would cause a disruption in the presentation of objects in a three-dimensional space. For example, the objects may disappear or otherwise behave erratically, thereby interrupting the illusion of the object being presented within the three-dimensional space. This undermines the perceived quality of the three-dimensional experience as a whole.

Traditional tracking systems rely on a single approach (Natural Feature Tracking (NFT), Simultaneous Localization And Mapping (SLAM), Gyroscopic, etc.) that each have breaking points in real world usage due to inaccurate sensor data, movement, loss or occlusion of visual marker, or dynamic interruptions to a scene. Further, each approach may have individual limitations in capability. For example, a gyroscopic tracking system can only track items with three degrees of freedom (3DoF). Further, utilization of single tracking systems provide inaccurate or unstable position estimation, due to inherent limitations of each individual system. For example, an NFT system may not provide sufficient pitch, yaw, or roll estimation due to the inaccuracies of visual tracking alone, while gyroscopic tracking systems provide inaccurate translation (up, down, left, right).

A redundant tracking system comprising multiple redundant tracking sub-systems, enabling seamless transitions between such tracking sub-systems, provides a solution to this problem by merging multiple tracking approaches into a single tracking system. This system is able to combine tracking objects with six degrees of freedom (6DoF) and 3DoF through combining and transitioning between multiple tracking systems based on the availability of tracking indicia tracked by the tracking systems. Thus, as the indicia tracked by any one tracking system becomes unavailable, the redundant tracking system seamlessly switches between tracking in 6DoF and 3DoF thereby providing the user with an uninterrupted experience. For example, in the case of visual tracking systems (e.g., NFT, SLAM), tracking indicia typically analyzed to determine orientation may be replaced with gyroscopic tracking indicia from a gyroscopic tracking system. This would thereby enable transitioning between tracking in 6Dof and 3DoF based on the availability of tracking indicia.

In some example embodiments, to transition between tracking in 6DoF and 3DoF, the redundant tracking system gathers and stores tracking indicia within a tracking matrix that includes translation indicia (e.g., up, down, left, right) and rotation indicia (e.g., pitch, yaw, roll). The translation indicia gathered by an NFT system may thereby be extracted from the tracking matrix and utilized when future translation indicia gathered by the NTT system become inaccurate or unavailable. In the meantime, the rotation indicia is continued to be provided by the gyroscope. In this way, when the mobile device loses tracking indicia, the tracked objects that are presented in the three-dimensional space will not be changed abruptly at the frame when the tracking indicia are lost. Subsequently, when the target tracking object reappears in the screen, thus a new translate $T_1$ is obtained, the translation part of the view matrix will then be taking advantage of the new translation $T_1$, and use $T_1-T_0$ as the translation of the view matrix.

The redundant tracking system is configured to render and display an object at a position in a three-dimensional space. For example, the redundant tracking system may maintain a set of templates to generate objects to be displayed in the three-dimensional space. Upon receiving a selection of a template from among the set of templates, and a selection of a position in the three-dimensional space, the redundant tracking system generates and assigns the object to the position within the three-dimensional space.

The redundant tracking system may thereby track the position of the object relative to a user device in the three-dimensional space by one or more tracking system, in 6DoF. For example, the one or more tracking systems of the redundant tracking system may collect and analyze a set of tracking indicia (e.g., roll, pitch, yaw, natural features and elements detected within the presentation of a space, etc.) in order to track the position of the object relative to the user device in the three-dimensional space with 6DoF. In such embodiments, the redundant tracking system may transition between tracking systems based on the availability of the tracked indicia to maintain consistent tracking in 6DoF.

Upon detecting an interruption of one or more indicia from among the set of indicia tracked, such that tracking in 6DoF becomes unreliable or impossible, the redundant tracking system transitions to tracking the object in the three-dimensional space in 3DoF in order to prevent an interruption of the display. For example, the redundant tracking system may transition from a first tracking system (or first set of tracking systems among the set of tracking systems) to a second tracking system among the set of tracking systems (or second set of tracking systems), wherein the second tracking system is capable of tracking the object with 3DoF in the three-dimensional space, based on the tracking indicia available.

In some example embodiments, the set of tracking systems of the redundant tracking system include a gyroscopic tracking system, an NFT system, as well as a SLAM tracking system. Each tracking system among the set of tracking system may analyze tracking indicia in order to track a position of an object within a three-dimensional space. For example, to track an object with 6DoF, the redundant tracking system may require at least six tracking indicia to be available. As tracking indicia become obstructed or unavailable for various reasons, the redundant tracking system may transition between the available tracking systems among the set of tracking systems in order to maintain 6DoF, or transition to 3DoF if necessary.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a redundant tracking system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The redundant tracking system 124 provides functionality to generate, display, and track objects at positions relative to the client device 102, within a three-dimensional space. The redundant tracking system 124 comprises a set tracking subsystems configured to track the object at the position in three-dimensional space based on a set of tracking indicia, and transition between tracking subsystems and between 6DoF and 3DoF based on an availability of the tracking indicia.

The application server 112 is communicatively coupled to a database server 118, which facilitates access to a database 120 in which is stored data associated with messages processed by the messaging server application 114.

Figure 2:
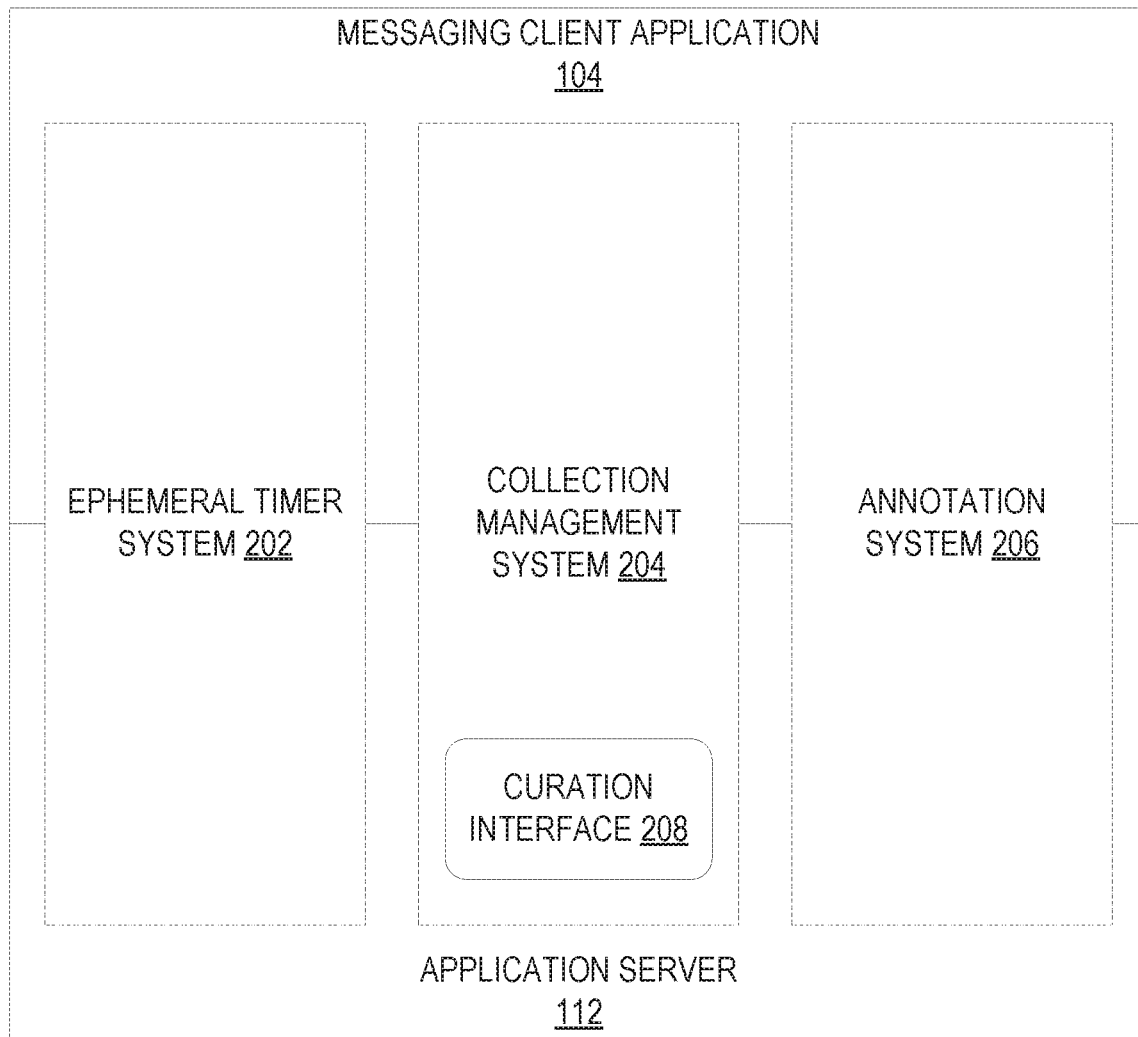
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
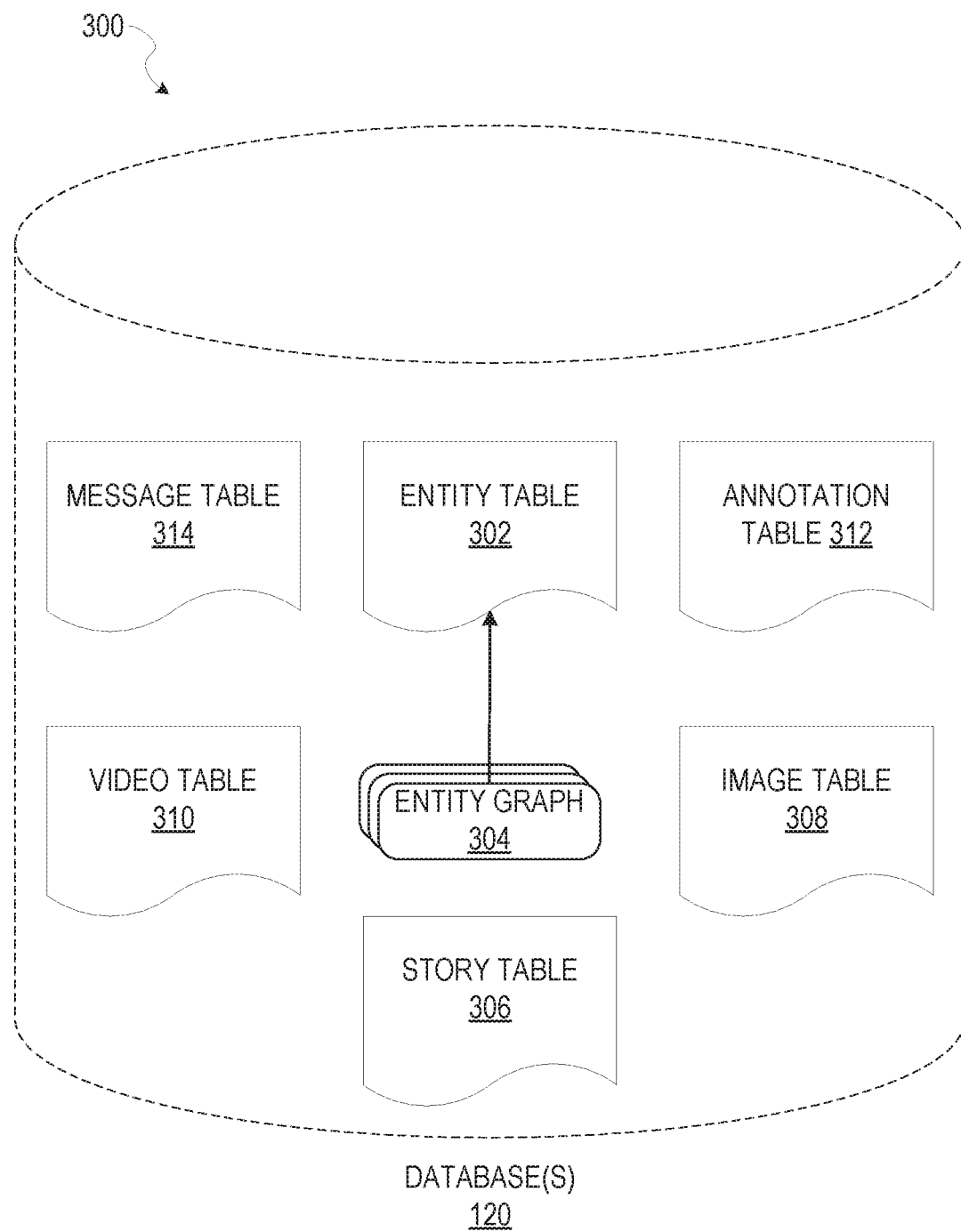
FIG. 3 is a schematic diagram illustrating data which may be stored in the database of the messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database)

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
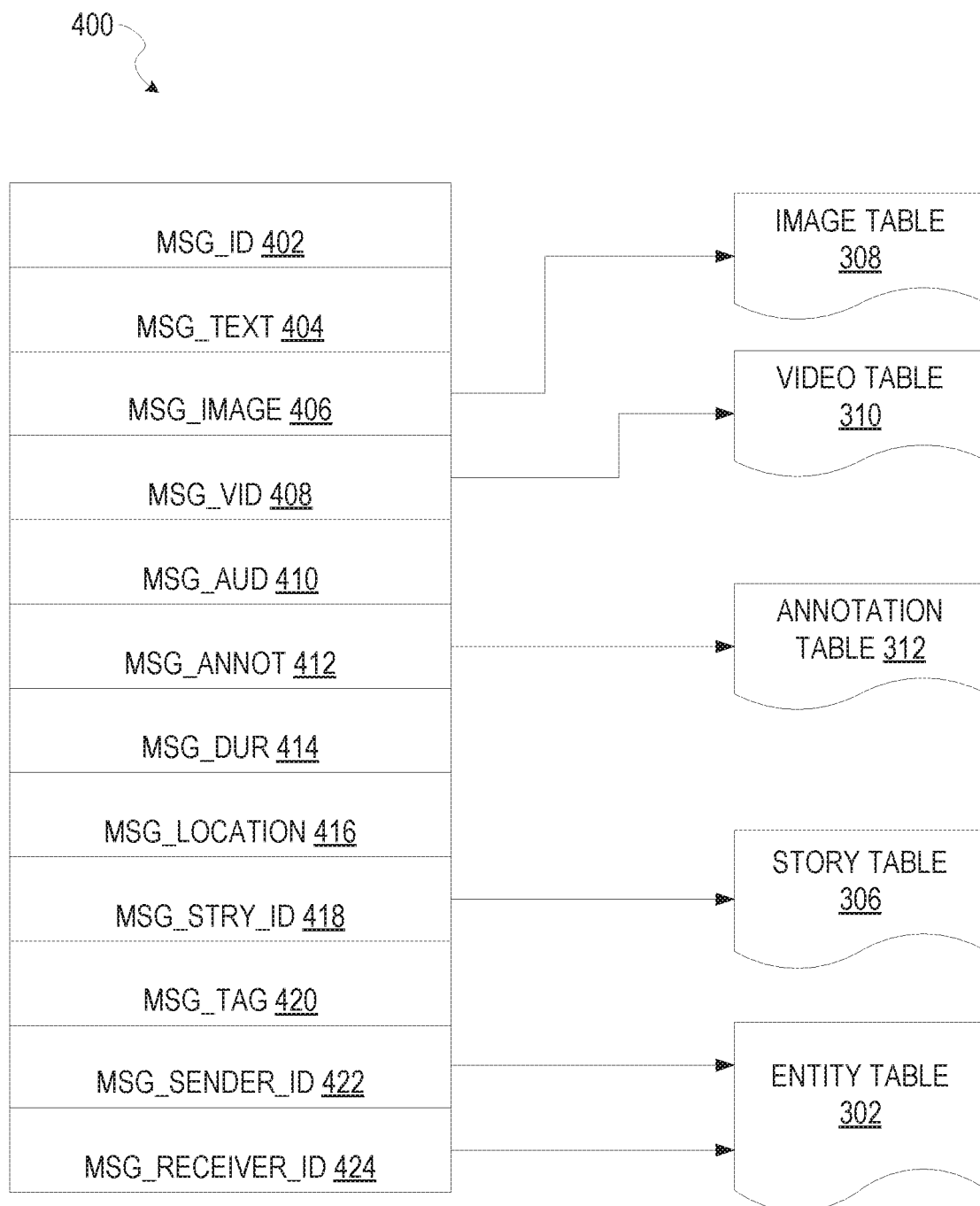
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identities the message 400, A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent

A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
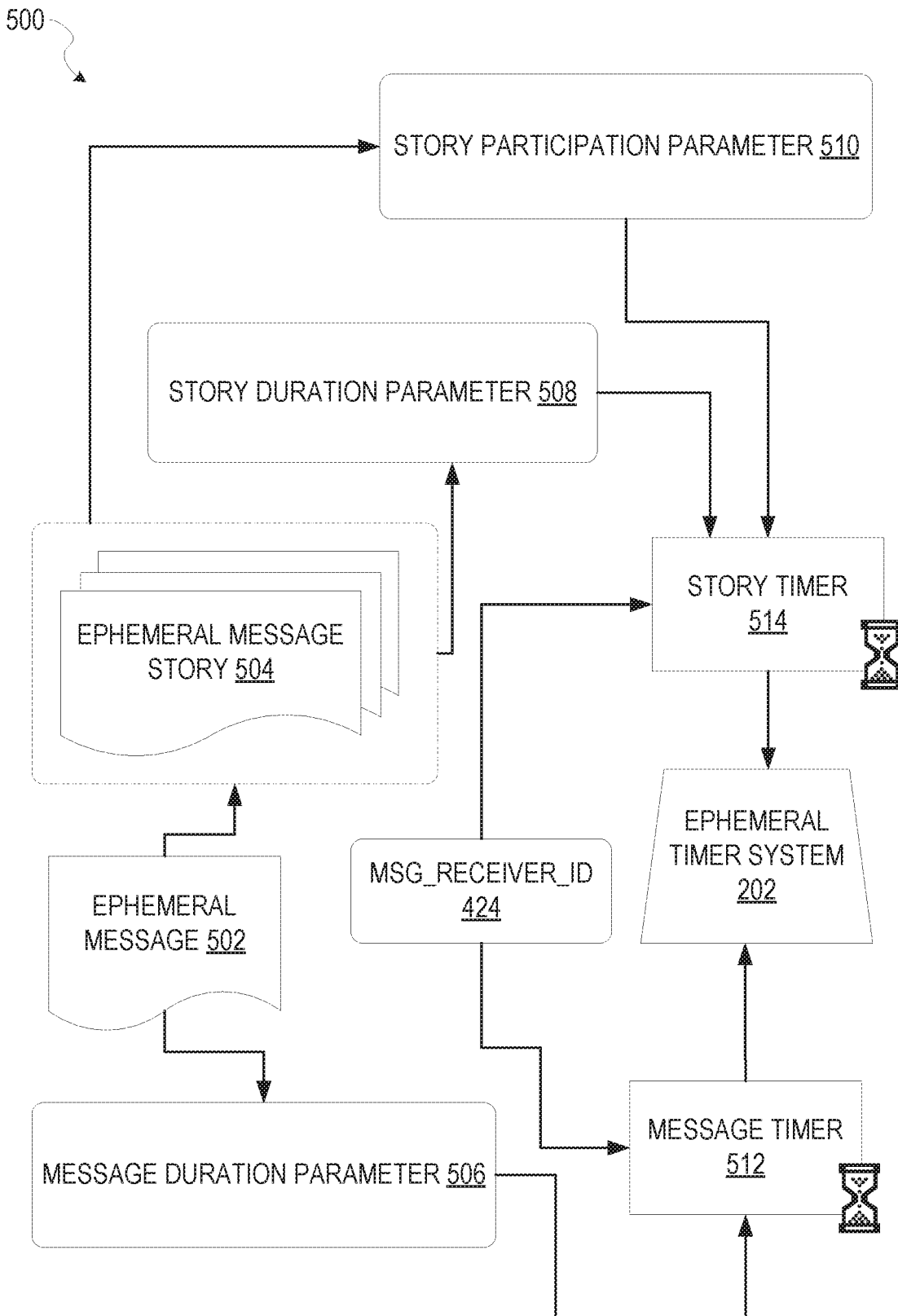
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral) in accordance with some embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT story, or an event story), The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504, Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
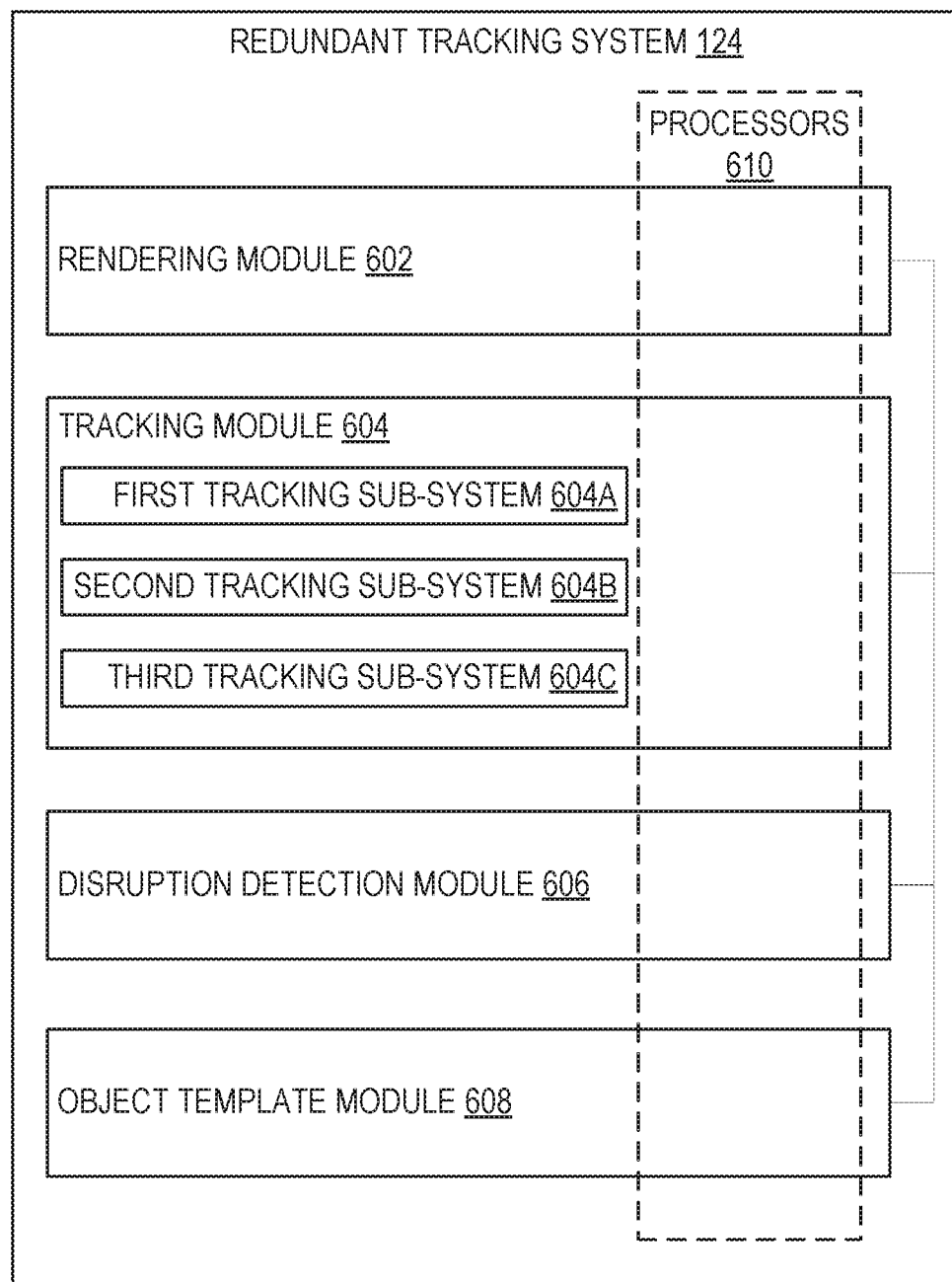
FIG. 6 is a block diagram illustrating various modules of a redundant tracking system, according to certain example embodiments.

FIG. 6 is a block diagram illustrating components of the redundant tracking system 124 that configure the redundant tracking system 124 to render an object at a position relative to the client device 102 in a three-dimensional space, track the position of the object in the three-dimensional space, and transition between tracking sub-systems based on an availability of tracking indicia, according to various example embodiments. The redundant tracking system 124 is shown as including a rendering module 602, a tracking module 604, a disruption detection module 606, and an object template module 608. In some example embodiments, the tracking module 604 may comprise a first tracking sub-system 604A, a second tracking sub-system 604B, and a third tracking sub-system 604C, wherein each tracking sub-system tracks the position of the object within the three-dimensional space based on a set of tracking indicia. The various modules of the redundant tracking system 124 may be configured to communicate with each other (e.g., via a bus, shared memory, or a switch). Any one or more of these modules may be implemented using one or more processors 610 (e.g., by configuring such one or more processors to perform functions described for that module) and hence may include one or more of the processors 610.

Any one or more of the modules described may be implemented using hardware alone (e.g., one or more of the processors 610 of a machine) or a combination of hardware and software. For example, any module described of the redundant tracking system 124 may physically include an arrangement of one or more of the processors 610 (e.g., a subset of or among the one or more processors of the machine) configured to perform the operations described herein for that module. As another example, any module of the engagement tracking system 610 may include software, hardware, or both, that configure an arrangement of one or more processors 610 (e.g., among the one or more processors of the machine) to perform the operations described herein for that module. Accordingly, different modules of the engagement tracking system 610 may include and configure different arrangements of such processors 610 or a single arrangement of such processors 610 at different points in time. Moreover, any two or more modules of the redundant tracking system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7:
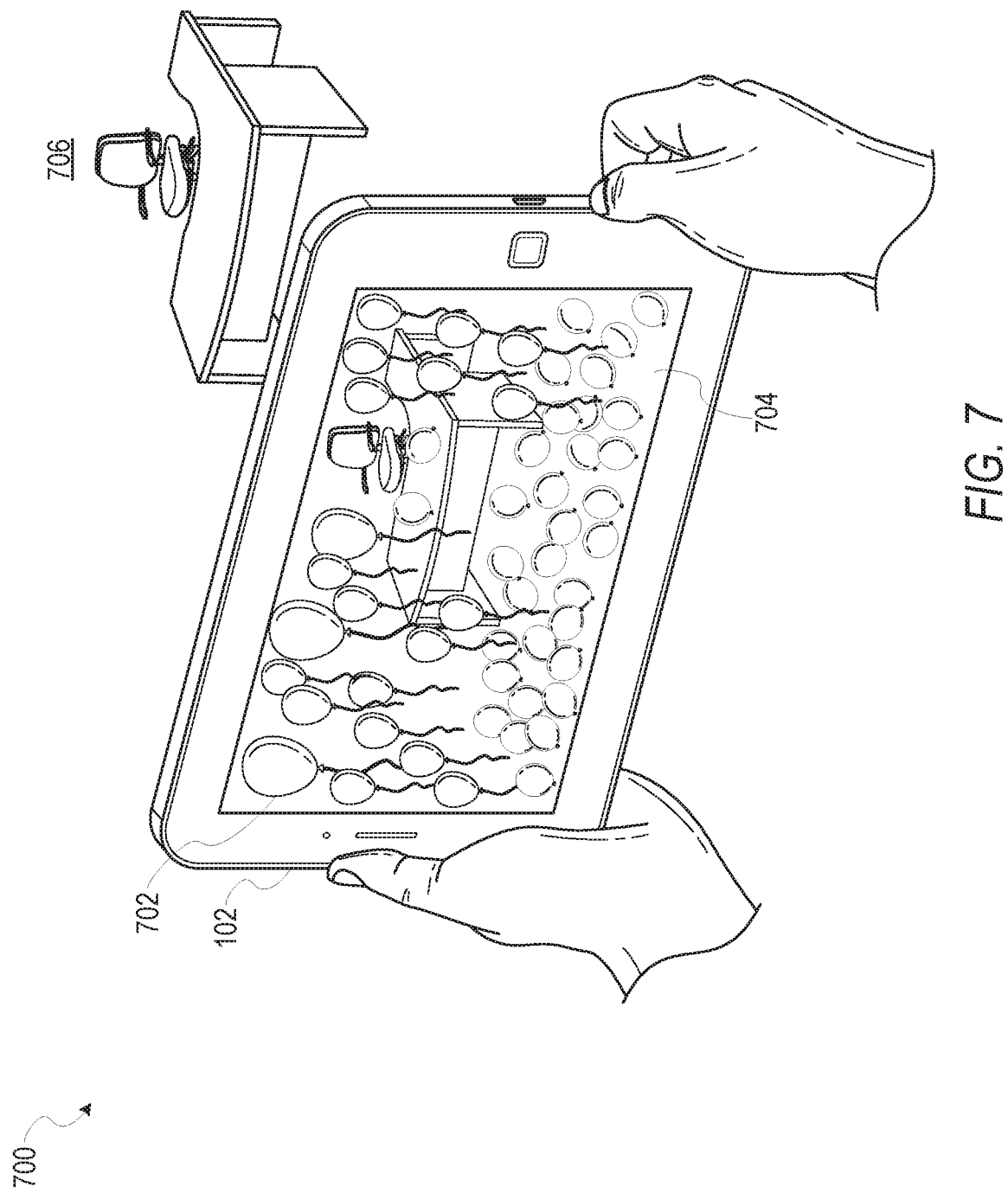
FIG. 7 is a diagram depicting an object rendered within a three-dimensional space by a redundant tracking system, according to certain example embodiments.

FIG. 7 is a diagram 700 depicting objects 702 (e.g., balloons) rendered within a presentation 704 of a three-dimensional space 706 by a redundant tracking system 124, according to certain example embodiments. As seen in FIG. 7, the objects 702 may be tracked in 3DoF or 6DoF based on the tracking indicia available to the redundant tracking system 124. As discussed above, the tracking indicia collected by the redundant tracking system 124, through the various tracking sub-systems (e.g., the first tracking sub-system 604A, the second tracking sub-system 604B, and the third tracking sub-system 604C) may include roll, pitch, and yaw, as well as natural features and elements detected within the presentation 704 of the three-dimensional space 706.

As a user moves the client device 102 about in the three-dimensional space 706, the redundant tracking system 124 collects tracking indicia to determine a relative position of the client device 102 within the three-dimensional space 706. Based on the relative position, the redundant tracking system 124 renders and causes display of the objects 702 at the appropriate positions within the presentation 704.

Figure 8:
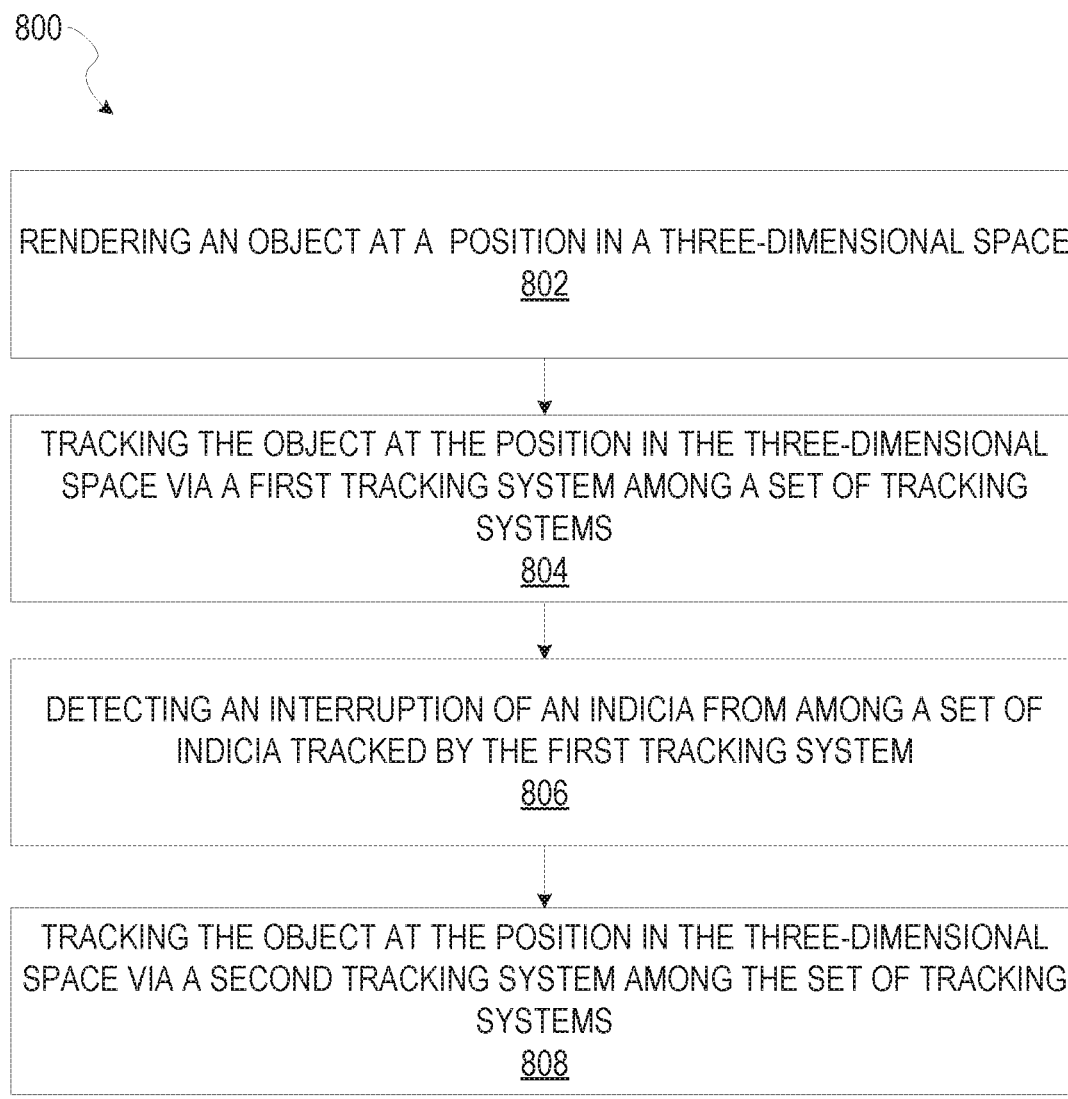
FIG. 8 is a flowchart illustrating a method for tracking an object rendered in a three-dimensional space, according to certain example embodiments.

FIG. 8 is a flowchart illustrating operations of the redundant tracking system 124 in performing a method 800 for tracking an object at a position relative to the client device 102 in a three-dimensional space, according to certain example embodiments. As shown in FIG. 8, one or more operations 802, 804, 806, and 808 may be performed as part (e.g., a precursor task, a subroutine, or a portion) of the method 800, according to some example embodiments.

At operation 802, the rendering module 602 renders an object at a position relative to the client device 102 in a three-dimensional space. The object may include interactive content generated by the user based on user provided parameters.

At operation 804, the tracking module 604 tracks the object in 6DoF at the position in the three-dimensional space via the first tracking sub-system 604A, or a combination of multiple tracking sub-systems (e.g., the first tracking sub-system 604A and the second tracking sub-system 604B), based on a set of tracking indicia. When tracking the object in 6DoF, a user viewing the object on the client device 102 can turn or move in any direction without disrupting tracking of the object. For example, the tracking module 604 may track the position of the object based on a combination of an NFT system and a gyroscopic tracking system.

At operation 806, the disruption detection module 606 detects an interruption of a tracking indicia from among the tracking indicia tracked by the tracking sub-systems (e.g., the first tracking sub-system 604A). For example, the first tracking sub-system may include a NFT system configured to rely on tracking indicia that include features of an environment or active light sources in proximity to annotated objects within the environment (e.g., the ground's plane, or the horizon). The NFT may therefore rely on the positions of three or more known features in the environment to determine the position of the object relative to the client device 102 in the three dimensional space. Should any one or more of the tracking indicia tracked by the first tracking sub-system 604A become obstructed or unavailable, the tracking of the object in the three-dimensional space would become disrupted.

At operation 808, in response to the disruption detection module 606 detecting a disruption of one or more tracking indicia, the tracking module 604 transitions to one or more other tracking sub-systems (e.g., the second tracking sub-system 604B and/or the third tracking sub-system 604C) to maintain tracking of the object relative to the client device 102 in the three-dimensional space. In doing so, the redundant tracking system 124 may transition from 6DoF to 3DoF, wherein 3DoF measures pitch, roll, and yaw, but does not measure translations. As the tracking indicia again become available, the redundant tracking system 124 may thereby transition from 3DoF back to 6DoF. For example, when the NFT system becomes unavailable, the tracking module 604 may utilize the last tracking indicia gathered and tracked by the NFT system throughout the subsequent 3DoF experience.

FIG. 9 is a flowchart illustrating operations of the redundant tracking system 124 in performing a method 900 for generating and presenting an object at a position relative to the client device 102 in a three-dimensional space, according to certain example embodiments. As shown in FIG. 9, one or more operations 902, 904, 906, 908, and 910 may be performed as part (e.g., a precursor task, a subroutine, or a portion) of the method 900, according to some example embodiments.

As depicted in operation 902, the object template module 608 maintains a set of templates for generating objects to be displayed in a three-dimensional space. For example, the templates may include one or more object parameters that configure behaviors of the object (e.g., sound sensitivity, position, movement, etc.). At operation 904, the object template module 608 receives a selection of a template from among the set of templates maintained.

At operation 906, the rendering module 602 receives a selection of a position in the three-dimensional space in which to render the object. For example, by selecting the position, the rendering module 602 may identify tracking indicia to be used by the tracking module 604 in tracking the object in the three-dimensional space. At operation 908, the rendering module 602 generates the object based on the selected template.

At operation 910, the rendering module 602 assigns the object to the position in three-dimensional space based on the selection and the tracking indicia identified. Having assigned the object to the position relative to the client device 102 in three-dimensional space, the tracking module 604 may thereby track the object in 6DoF based on the tracking indicia.

Figure 10:
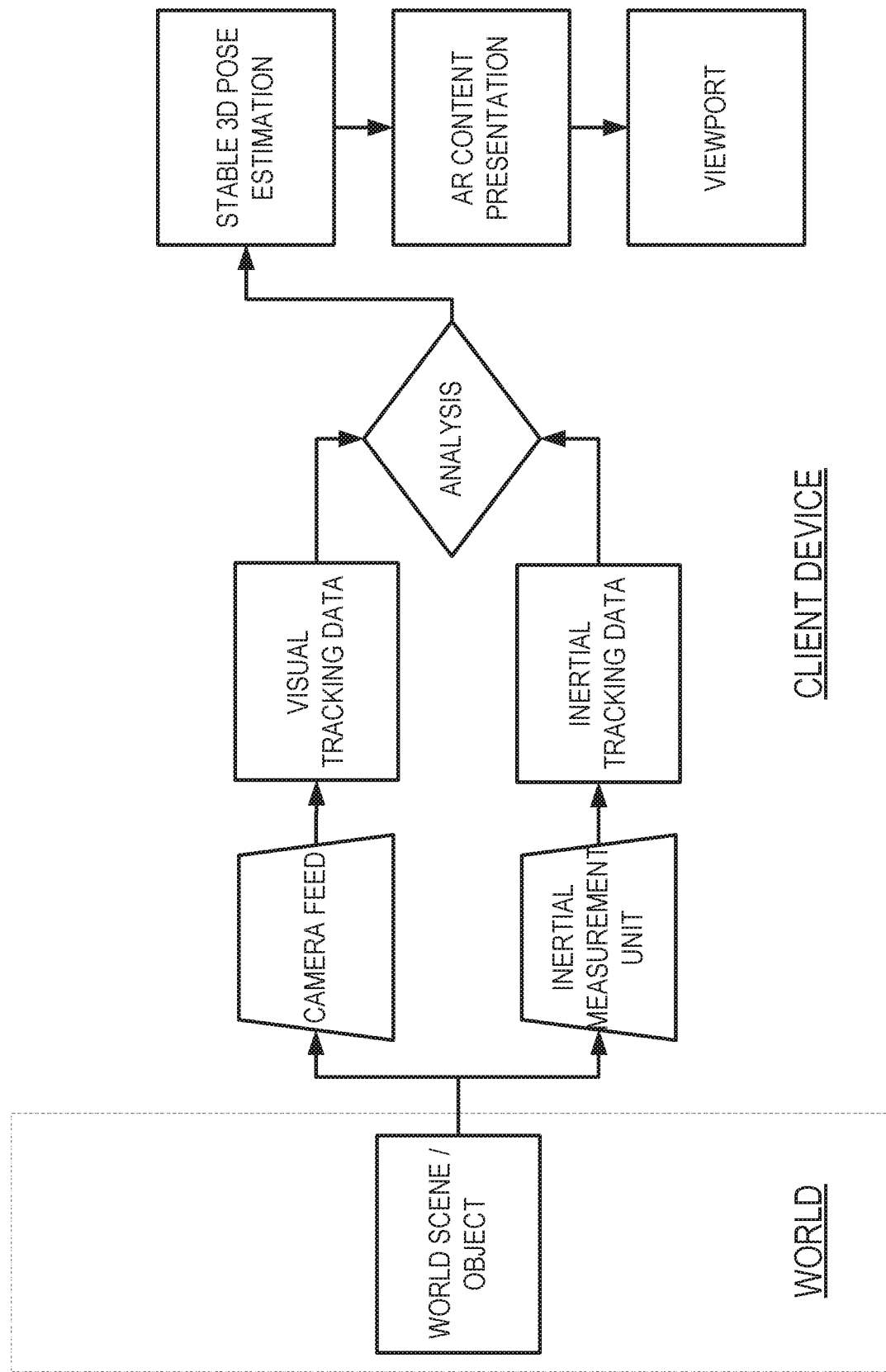
FIG. 10 is a flowchart illustrating a method for tracking an object rendered in a three-dimensional space, according to certain example embodiments.

FIG. 10 is a flowchart illustrating a method for tracking an object rendered in a three-dimensional space, according to certain example embodiments. As seen in FIG. 10, a world scene/object is collected by sub-systems of the redundant tracking system 124. For example, the redundant tracking system 124 may include a camera of a user device that collects visual tracking data (i.e., tracking indicia/translation indicia), and an inertial measurement unit (e.g., gyroscope) to collect inertial tracking data (i.e., tracking indicia/rotation indicia). The tracking indicia are thereby analyzed by the redundant tracking system 124 in order to determine a position of the object in the three-dimensional space, and cause display of a presentation of the object based on the position of the object in the three-dimensional space, within a viewport of a client device (e.g., client device 102).

Figure 11:
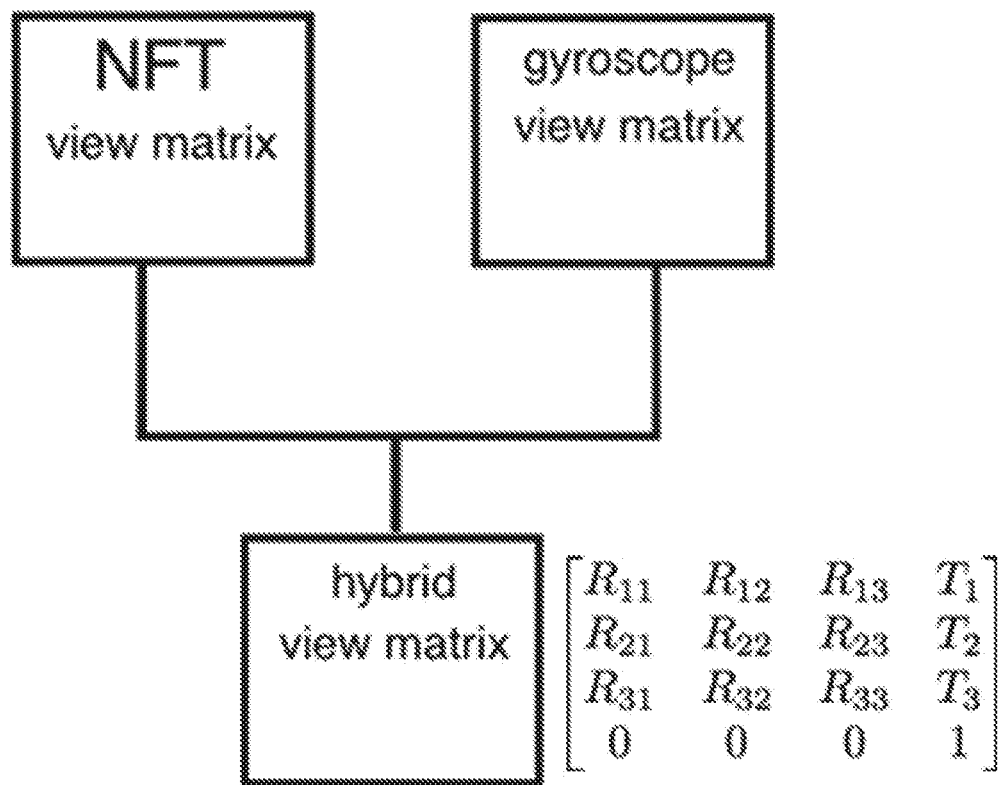
FIG. 11 is a block diagram illustrating a hybrid tracking matrix, according to certain example embodiments.

FIG. 11 is a block diagram illustrating a hybrid tracking matrix, according to certain example embodiments. As explained generally in FIG. 10, the various tracking sub-systems of the redundant tracking system 124 collect tracking indicia. The tracking indicia are entered into a hybrid tracking matrix that includes rotation indicia and translation indicia, useable by the redundant tracking system 124 to determine a position of the object in the three-dimensional space.

For example, the position of the object in the three-dimension space may be determined based on the following scenarios.

Scenario I: The object is tracked in the three-dimensional space

Scenario II: The redundant tracking system 124 loses track of the object due to inaccurate or unavailable tracking indicia In Scenario I, the tracking of the object begins by the object being detected by the redundant tracking system 124.

In this scenario, the tracking matrix may indicate:

$$\begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix}$$

Where $R_{ij}$ is rotation indicia collected by the inertial measurement unit (i.e., gyroscopic tracking system), and $T_x$ is translation indicia determined by a camera or other visual tracking system (e.g., an NFT system). Specifically, $T_i$ is the translation part of the NFT matrix illustrated in FIG. 11, and $R_{ij}$ is the gyroscopic view matrix illustrated in FIG. 11. The determination of the position of the object in the three-dimensional space is determined based on the hybrid matrix above.

When transitioning from Scenario I to Scenario II, in order to create a smooth transition and prevent loss of information, the system keeps using the most recently collected $T_i$ value when tracking indicia was still available. When the system again identifies tracking indicia, to transition from Scenario II back to Scenario I, and to prevent an abrupt "jump" in tracking of the object due to the difference between the last collected $T_i$ value and a current $T_i$ value, the redundant tracking system 124 calculates a new $T_i$ based on a difference between the last collected $T_i$ value and the current $T_i$.

Figure 12:
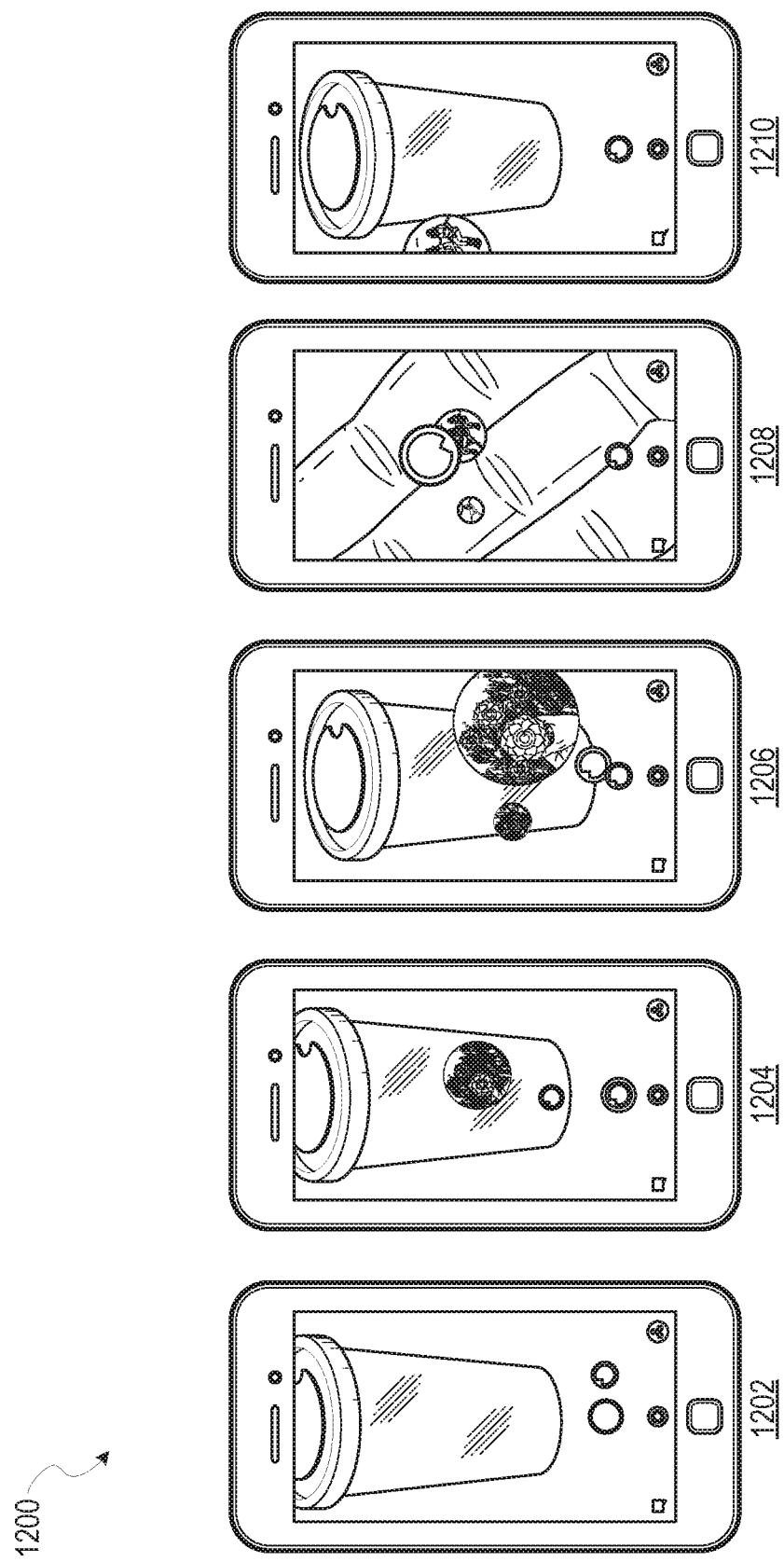
FIG. 12 is a flowchart illustrating a method for generating and rendering an object in a three-dimensional space, according to certain example embodiments.

FIG. 12 is a flow diagram illustrating operations of a method 1200 for generating, rendering, and tracking an object in a three-dimensional space, according to certain example embodiments. As seen at operation 1202 of FIG. 12, a three-dimensional space is captured and presented at a client device 102. As seen in FIG. 12, the three-dimensional space may include features and elements which may be identified and tracked as tracking indicia by the redundant tracking system 124.

At operation 1204, the redundant tracking system 124 generates and displays one or more objects at positions in the presentation of the three-dimensional space, based on the tracking indicia collected by the sub-systems of the redundant tracking system 124. For example, the objects may include animated bubbles that include pictures and images.

At operation 1206, as a user moves the client device 102 to a different perspective, the redundant tracking system 124 tracks and displays the objects based on a relative position of the client device 102 to the tracking indicia.

At operation 1208, a portion of the tracking indicia are interrupted (e.g., by a user's hand). The redundant tracking system 124 maintains relative positions of the objects based on the remaining tracking indicia available. For example, while natural feature tracking may become unavailable due to the interruption, the redundant tracking system 124 may rely on other tracking indicia such as pitch, yaw, and the like.

At operation 1210, the full spectrum of tracking indicia is again available, and the redundant tracking system 124 may resume tracking the object in the presentation of the space.

The redundant tracking system 124 collects tracking indicia to track the object with 6DoF. As the tracking indicia collected by the redundant tracking system are interrupted, the redundant tracking system transitions to tracking the object in 3DoF. Once the tracking indicia are again available, the redundant tracking system 124 resumes tracking the object in 6DoF.

Software Architecture

Figure 13:
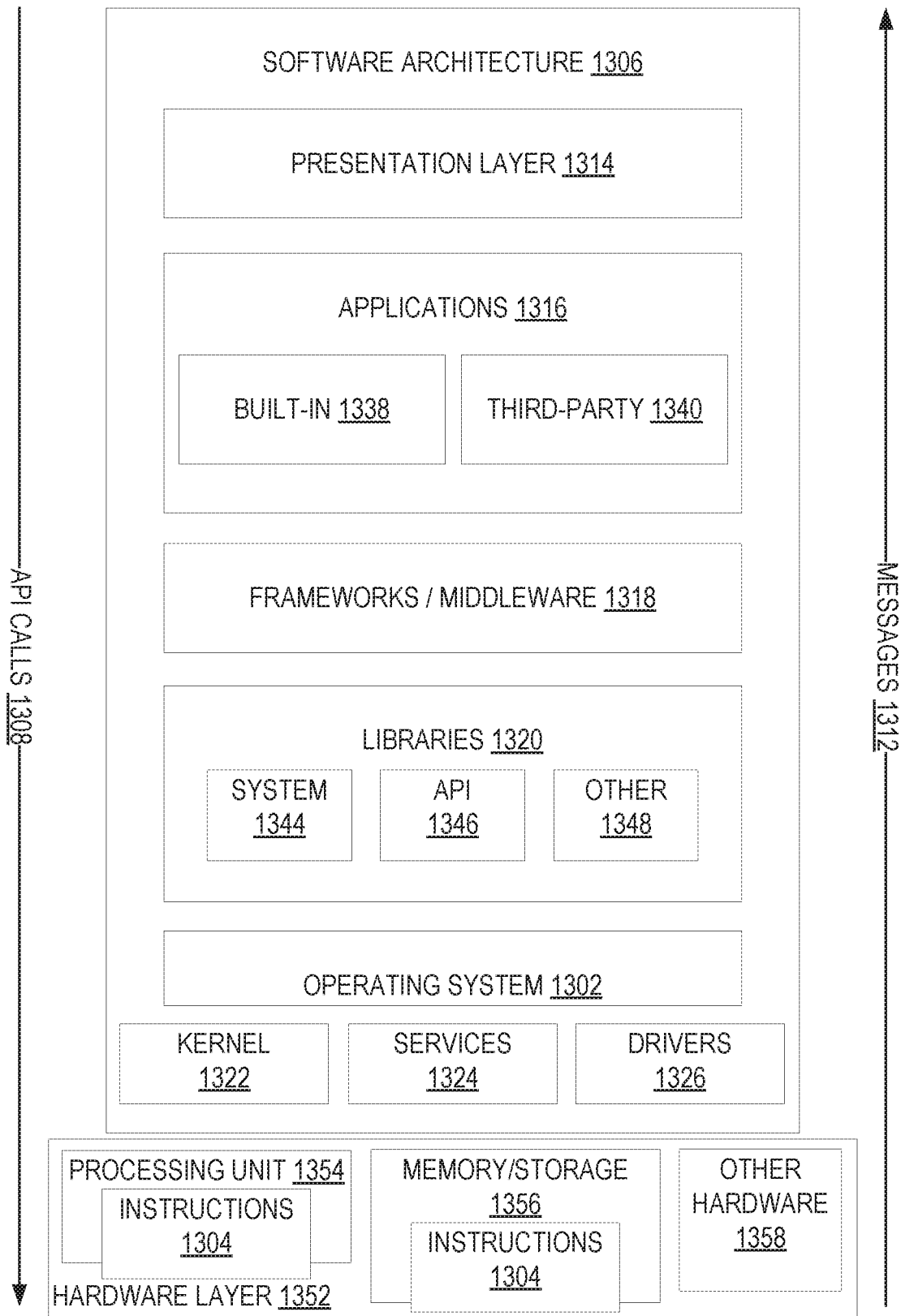
FIG. 13 is a block diagram illustrating a representative software architecture, which may be used in conjunction with various hardware architectures herein described and used to implement various embodiments.

FIG. 13 is a block diagram illustrating an example software architecture 1306, which may be used in conjunction with various hardware architectures herein described. FIG. 13 is a non-limiting example of a software architecture and it will be appreciated that many other architectures may be implemented to facilitate the functionality described herein. The software architecture 1306 may execute on hardware such as machine 1400 of FIG. 14 that includes, among other things, processors 1404, memory 1414, and I/O components 1418. A representative hardware layer 1352 is illustrated and can represent, for example, the machine 1400 of FIG. 14. The representative hardware layer 1352 includes a processing unit 1354 having associated executable instructions 1304. Executable instructions 1304 represent the executable instructions of the software architecture 1306, including implementation of the methods, components and so forth described herein. The hardware layer 1352 also includes memory and/or storage modules memory/storage 1356, which also have executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, applications 1316 and a presentation layer 1314. Operationally, the applications 1316 and/or other components within the layers may invoke application programming interface (API) API calls 1308 through the software stack and receive a response as in response to the API calls 1308. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324 and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than to interface directly with the underlying operating system 1302 functionality (e.g., kernel 1322, services 1324 and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 (also sometimes referred to as middleware) provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party, applications 1340. Examples of representative built-in applications 1338 may include, but are not limited to, a contacts application, a browser application, a book reader application, a location application, a media application, a messaging application, and/or a game application. Third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as operating system 1302) to facilitate functionality described herein.

The applications 1316 may use built in operating system functions (e.g., kernel 1322, services 1324 and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/component "logic" can be separated from the aspects of the application/component that interact with a user.

Figure 14:
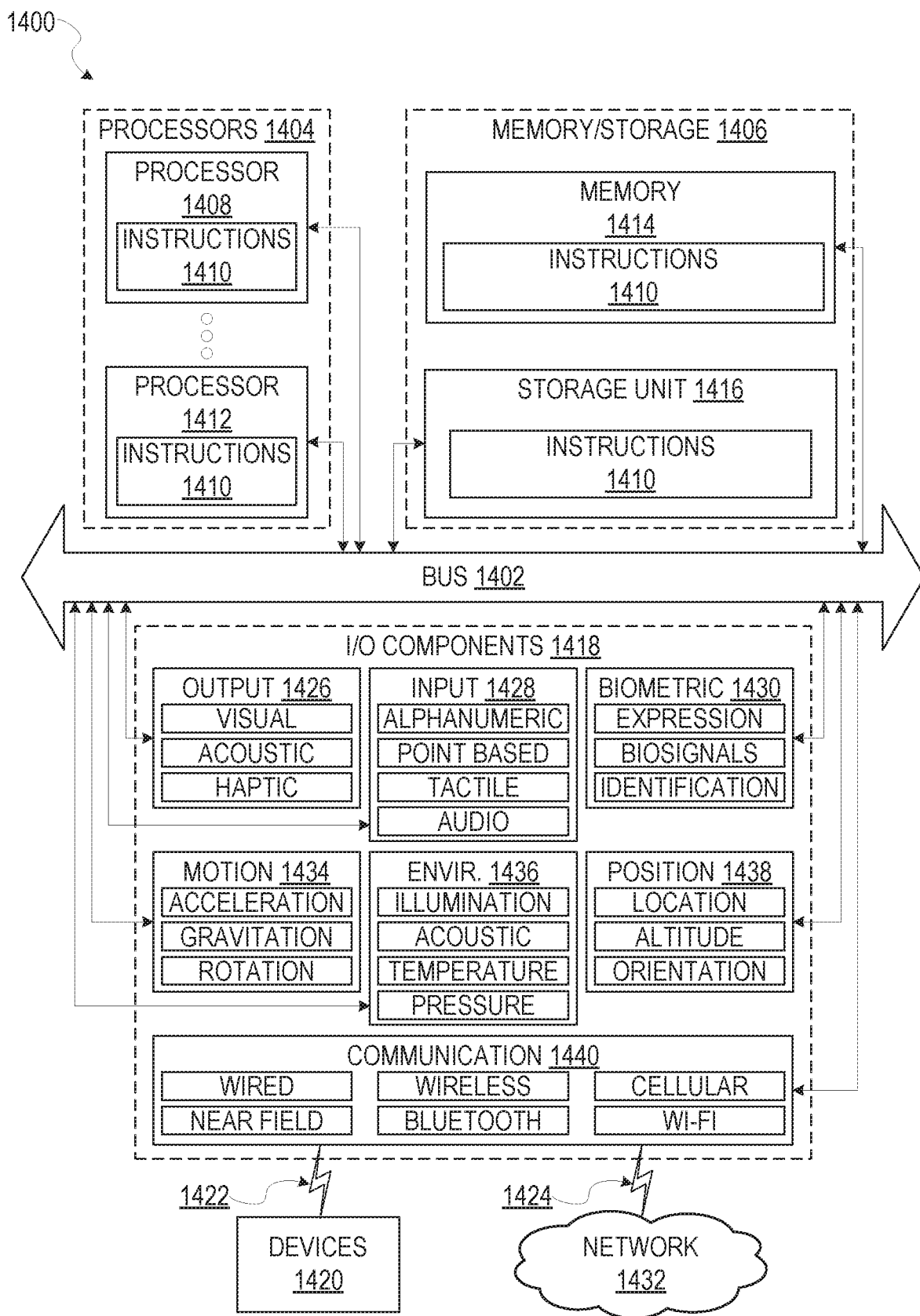
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory memory/storage 1406, and I/O components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion and the grouping is in no way limiting. In various example embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environmental environment components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via coupling 1422 and coupling 1424 respectively. For example, the communication components 1440 may include a network interface component or other suitable device to interface with the network 1432. In further examples, communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a Universal Serial Bus USB)).

Moreover, the communication components 1440 may detect identifiers or include components operable to detect identifiers. For example, the communication components 1440 may include Radio Frequency Identification (RFID) tag reader components, NEC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as, location via Internet Protocol (IP) geo-location, location via Wi-Fi®, signal triangulation, location via detecting a NEC beacon signal that may indicate a particular location, and so forth.

What is claimed is:

1. A system comprising:
   a memory; and
   at least one hardware processor coupled to the memory and comprising a redundant tracking system, and one or more processors that cause the system to perform operations comprising:
   causing display of a graphical object at a position within a presentation of a stream of image data at a client device;
   tracking the position of the graphical object based on a set of tracking indicia, the set of tracking indicia including temporal data;
   detecting an interruption in at least a first portion of the set of tracking indicia;
   identifying a second portion of the set of tracking indicia based on the temporal data that corresponds with the second portion of the set of tracking indicia in response to the detecting the interruption; and
   tracking the position of the graphical object based on the second portion of the set of tracking indicia.

2. The system of claim 1, wherein the rendering the object at the position in the three-dimensional space includes:
   receiving an input that selects a point that corresponds with the position in a presentation of the three-dimensional space.

3. The system of claim 1, wherein the set of tracking indicia comprise at least six tracking indicia.

4. The system of claim 1, wherein the redundant tracking system comprises a set of tracking systems that include at least a simultaneous localization and mapping tracking system, a natural feature tracking system, and a gyroscopic tracking system.

5. The system of claim 1, wherein the tracking the object at the position in the three-dimensional space includes tracking pitch, yaw, roll, and translations based on at least a subset of the set of tracking indicia.

6. The system of claim 1, wherein the redundant tracking system comprises a plurality of tracking subsystems that include a natural feature tracking system, the first portion of the set of tracking indicia include an image feature from the stream of image data, and the detecting the interruption in at least the first portion of the set of tracking indicia includes:
   detecting an obstruction that obstructs the image feature from the stream of image data.

7. The system of claim 1, wherein the causing display of the graphical object at the position within the presentation of the stream of image data at the client device includes:
   receiving an input that selects the graphical object from among a collection of graphical objects.

8. A method comprising:
   causing display of a graphical object at a position within a presentation of a stream of image data at a client device;
   tracking the position of the graphical object based on a set of tracking indicia, the set of tracking indicia including temporal data;
   detecting an interruption in at least a first portion of the set of tracking indicia;
   identifying a second portion of the set of tracking indicia based on the temporal data that corresponds with the second portion of the set of tracking indicia in response to the detecting the interruption; and
   tracking the position of the graphical object based on the second portion of the set of tracking indicia.

9. The method of claim 8, wherein the rendering the object at the position in the three-dimensional space includes:
   receiving an input that selects a point that corresponds with the position in a presentation of the three-dimensional space.

10. The method of claim 8, wherein the set of tracking indicia comprise at least six tracking indicia.

11. The method of claim 8, wherein the redundant tracking system comprises a set of tracking systems that include at least a simultaneous localization and mapping tracking system, a natural feature tracking system, and a gyroscopic tracking system.

12. The method of claim 8, wherein the tracking the object at the position in the three-dimensional space includes tracking pitch, yaw, roll, and translations based on at least a subset of the set of tracking indicia.

13. The method of claim 8, wherein the redundant tracking system comprises a plurality of tracking subsystems that include a natural feature tracking system, the first portion of the set of tracking indicia include an image feature from the stream of image data, and the detecting the interruption in at least the first portion of the set of tracking indicia includes:
   detecting an obstruction that obstructs the image feature from the stream of image data.

14. The method of claim 8, wherein the causing display of the graphical object at the position within the presentation of the stream of image data at the client device includes:
   receiving an input that selects the graphical object from among a collection of graphical objects.

15. A non-transitory machine-readable storage medium including a redundant tracking system, the redundant tracking system comprising a set of tracking systems, and comprising instructions that, when executed by one or more processors of a machine, cause the machine to perform operations comprising:
   causing display of a graphical object at a position within a presentation of a stream of image data at a client device;
   tracking the position of the graphical object based on a set of tracking indicia, the set of tracking indicia including temporal data;
   detecting an interruption in at least a first portion of the set of tracking indicia;
   identifying a second portion of the set of tracking indicia based on the temporal data that corresponds with the second portion of the set of tracking indicia in response to the detecting the interruption; and
   tracking the position of the graphical object based on the second portion of the set of tracking indicia.

16. The non-transitory machine-readable storage medium of claim 15, wherein the rendering the object at the position in the three-dimensional space includes:
   receiving an input that selects a point that corresponds with the position in a presentation of the three-dimensional space.

17. The non-transitory machine-readable storage medium of claim 15, wherein the set of tracking indicia comprise at least six tracking indicia.

18. The non-transitory machine-readable storage medium of claim 15, wherein the redundant tracking system comprises a set of tracking systems that include at least a simultaneous localization and mapping tracking system, a natural feature tracking system, and a gyroscopic tracking system.

19. The non-transitory machine-readable storage medium of claim 15, wherein the tracking the object at the position in the three-dimensional space includes tracking pitch, yaw, roll, and translations based on at least a subset of the set of tracking indicia.

20. The non-transitory machine-readable storage medium of claim 15, wherein the redundant tracking system comprises a plurality of tracking subsystems that include a natural feature tracking system, the first portion of the set of tracking indicia include an image feature from the stream of image data, and the detecting the interruption in at least the first portion of the set of tracking indicia includes:

detecting an obstruction that obstructs the image feature from the stream of image data.

* * * * *

UNITED STATES PATENT AND TRADEMARK OFFICE
CERTIFICATE OF CORRECTION

PATENT NO.         : 10,803,664 B2
APPLICATION NO.    : 16/853356
DATED              : October 13, 2020
INVENTOR(S)        : McPhee et al.

Page 1 of 1

It is certified that error appears in the above-identified patent and that said Letters Patent is hereby corrected as shown below:

On the Title Page

On page 2, in Column 2, item (56) under "Other Publications", Line 5, before "filed", insert --Response--

On page 2, in Column 2, item (56) under "Other Publications", Line 7, before "filed", insert --Response--

On page 2, in Column 2, item (56) under "Other Publications", Line 13, before "filed", insert --Response--

On page 2, in Column 2, item (56) under "Other Publications", Line 17, before "filed", insert --Response--

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*